US 6,593,422 B2

(12) United States Patent
Lin

(10) Patent No.: US 6,593,422 B2
(45) Date of Patent: Jul. 15, 2003

(54) EMULSIONS CONTAINING CROSSLINKED AND NON-CROSSLINKED SILICONE POLYETHERS

(75) Inventor: Zuchen Lin, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 239 days.

(21) Appl. No.: 09/866,995

(22) Filed: May 29, 2001

(65) Prior Publication Data

US 2002/0193511 A1 Dec. 19, 2002

(51) Int. Cl.$^7$ .............................................. C08L 83/10
(52) U.S. Cl. ........................... 524/837; 528/15; 528/25; 516/76
(58) Field of Search .................... 516/76; 524/837; 525/100, 478; 528/15, 25

(56) References Cited

U.S. PATENT DOCUMENTS

| | | | |
|---|---|---|---|
| 4,290,897 A | 9/1981 | Swihart | 210/710 |
| 4,526,680 A | 7/1985 | Owen | 209/166 |
| 5,300,667 A | 4/1994 | Kasprzak et al. | 556/437 |
| 5,387,417 A | 2/1995 | Rentsch | 424/401 |
| 5,389,365 A | 2/1995 | LeGrow et al. | 424/78.03 |
| 5,654,362 A | 8/1997 | Schulz, Jr. et al. | 524/862 |
| 5,708,057 A | 1/1998 | Morita et al. | 523/402 |
| 5,811,487 A | 9/1998 | Schulz, Jr. et al. | 524/862 |
| 5,871,761 A | 2/1999 | Kuwata et al. | 424/401 |
| 5,889,108 A | 3/1999 | Zhang | 524/862 |
| 5,948,855 A * | 9/1999 | Lin et al. | 524/837 |
| 6,071,975 A | 6/2000 | Halloran | 516/58 |
| 6,221,979 B1 | 4/2001 | Lin et al. | 525/477 |
| 6,476,123 B1 * | 11/2002 | Morita et al. | 524/837 |
| 6,531,542 B1 | 3/2003 | Morita et al. | 524/837 |

* cited by examiner

*Primary Examiner*—Daniel S. Metzmaier
(74) *Attorney, Agent, or Firm*—Jim L. DeCesare

(57) ABSTRACT

Emulsions are prepared by heating and polymerizing a mixture containing (i) a non-crosslinked silicone polyether; (ii) optionally, a cosurfactant which can be a monohydroxy alcohol, diol, triol, or glycol ether; (iii) an ≡Si—H containing polysiloxane; (iv) a mono-alkenyl polyether; (v) an α,ω-diene, α,ω-diyne, or α,ω-ene-yne; (vi) optionally, a silicone oil such as (a) a low molecular weight linear or cyclic volatile methyl siloxane, or (b) a low molecular weight linear or cyclic volatile or non-volatile alkyl or aryl siloxane; (vii) a platinum catalyst; and (viii) water.

4 Claims, No Drawings ically is 2–8 for connecting

EMULSIONS CONTAINING CROSSLINKED AND NON-CROSSLINKED SILICONE POLYETHERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is related to emulsions and preparing emulsions using non-crosslinked silicone polyethers and crosslinked silicone polyethers. In a first embodiment, emulsions containing non-crosslinked silicone polyethers and crosslinked silicone polyethers are prepared by emulsion polymerization. In a second embodiment, emulsions containing non-crosslinked silicone polyethers and crosslinked silicone elastomers containing no oxyalkylene units are prepared mechanically.

BACKGROUND OF THE INVENTION

While U.S. Pat. No. 5,387,417 (Feb. 7, 1995) suggests using certain non-crosslinked silicone polyethers in combination with certain crosslinked silicone polyethers for preparing emulsions, the '417 patent does not teach preparing emulsions using emulsion polymerization, a first embodiment of the present invention.

In addition, where emulsions in the '417 patent are prepared mechanically, the '417 patent does not teach preparing mechanical emulsions with a non-crosslinked silicone polyether in combination with a crosslinked silicone elastomer containing no oxyalkylene units, a second embodiment of the invention. Further, and in this regard, the '417 patent does not teach preparing emulsions with a non-crosslinked silicone polyether in combination with a crosslinked silicone elastomer containing no oxyalkylene units, without application of any mechanical shearing force.

BRIEF SUMMARY OF THE INVENTION

In a first embodiment, the invention is directed to a method of preparing emulsions by heating and polymerizing a mixture containing (i) a non-crosslinked silicone polyether; (ii) optionally, a cosurfactant which can be a monohydroxy alcohol, diol, triol, or glycol ether; (iii) an $\equiv$Si—H containing polysiloxane; (iv) a mono-alkenyl polyether; (v) an $\alpha,\omega$-diene, $\alpha,\omega$-diyne, or $\alpha,\omega$-ene-yne; (vi) optionally, a silicone oil such as (a) a low molecular weight linear or cyclic volatile methyl siloxane, or (b) a low molecular weight linear or cyclic volatile or non-volatile alkyl or aryl siloxane; (vii) a platinum catalyst; and (viii) water.

The crosslinked silicone polyether is obtained as a result of polymerization of components (iii), (iv), and (v).

In a second embodiment, the invention is directed to a method of making oil-in-water emulsions by mixing (i) a non-crosslinked silicone polyether; (ii) a cosurfactant such as a monohydroxy alcohol, diol, triol, or glycol ether; and (iii) water; with (iv) a crosslinked silicone elastomer containing no oxyalkylene units prepared by reacting (a) an $\equiv$Si—H containing polysiloxane; (b) an $\alpha,\omega$-diene, $\alpha,\omega$-diyne, or $\alpha,\omega$-ene-yne; (c) a silicone oil such as (I) a low molecular weight linear or cyclic volatile methyl siloxanes, or (II) a low molecular weight linear or cyclic volatile or non-volatile alkyl or aryl siloxane; and (d) a platinum catalyst.

The invention is also directed to emulsions prepared according to the methods of each of these embodiments.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

Non-Crosslinked Silicone Polyether (SPE) Surfactant

The non-crosslinked silicone polyether is generally water soluble or water dispersible. It can have a rake type structure wherein the polyoxyethylene or polyoxyethylene-polyoxypropylene copolymeric units are grafted onto the siloxane backbone, or the SPE can have an ABA block copolymeric structure wherein A represents the polyether portion and B the siloxane portion of an ABA structure.

Non-crosslinked silicone polyethers suitable for use herein have the formula $MD_{0-1,000}D'_{1-100}M$, most preferably the formula $MD_{0-500}D'_{1-50}M$, where M represents monofunctional unit $R_3SiO_{1/2}$, D represents difunctional unit $R_2SiO_{2/2}$, and D' represents difunctional unit $RR'SiO_{2/2}$. In these formulas, R is an alkyl group containing 1–6 carbon atoms or an aryl group, and R' is an oxyalkylene containing moiety. The R' groups may contain only oxyethylene (EO) units; a combination of oxyethylene (EO) and oxypropylene (PO) units; or a combination of oxyethylene (EO) units, oxypropylene (PO) units, and oxybutylene (BO) units. Preferred R' groups include oxyalkylene units in the approximate ratio of $EO_{3-100}PO_{0-100}$, most preferably in the ratio $EO_{3-30}PO_{1-30}$.

R' moieties typically includes a divalent radical such as $—C_mH_{2m}—$ where m is 2–8 for connecting the oxyalkylene portion of R' to the siloxane backbone. Such moieties also contain a terminating radical for the oxyalkylene portion of R' such as hydrogen, hydroxyl, or an alkyl, aryl, alkoxy, or acetoxy group.

Non-crosslinked silicone polyethers useful herein can also be of a type having the formula $M'D_{10-1,000}D'_{0-100}M'$, most preferably the formula $M'D_{10-500}D'_{0-50}M'$, wherein M' represents monofunctional unit $R_2R'SiO_{1/2}$, D represents difunctional unit $R_2SiO_{2/2}$, and D' represents difunctional unit $RR'SiO_{2/2}$. In these formulas, R can be an alkyl group containing 1–6 carbon atoms or an aryl group, and again R' represents an oxyalkylene containing moiety. As noted previously, R' groups typically contain only oxyethylene (EO) units or combinations of oxyethylene (EO) and oxypropylene (PO) units. Such R' groups include these oxyalkylene units in the ratio $EO_{3-100}PO_{0-100}$, most preferably $EO_{3-30}PO_{1-30}$.

As also noted previously, R' moieties typically include a divalent radical $—C_mH_{2m}—$ where m is 2–8 for connecting the oxyalkylene portions of R' to the siloxane backbone. In addition, the moiety R' contains a terminating radical for oxyalkylene portions of R' such as hydrogen, hydroxyl, an alkyl, aryl, alkoxy, or acetoxy group.

In addition, non-crosslinked silicone polyethers useful herein can having the formula $MD_{0-1,000}D'_{0-100}D''_{1-1,00}M$ wherein D" represents difunctional unit RR"SiO$_{2/2}$, and R" is an alkyl group containing 1–40 carbon atoms. M, D, D', and R, are the same as defined above.

Table I shows some representative non-crosslinked silicone polyethers conforming to these formulas which can be used in preparing emulsions according to the invention.

TABLE I

| Non-Crosslinked Silicone Polyether | Nominal Structure of Non-Crosslinked Silicone Polyethers |
|---|---|
| A | MD$_{8.6}$D'$_{3.6}$M where R is —CH$_3$ and R' is —(CH$_2$)$_3$(EO)$_{12}$OH |
| B | MD$_{108}$D'$_{10}$M where R is —CH$_3$ and R' is —(CH$_2$)$_3$(EO)$_{10}$(PO)$_4$OH |
| C | M'D'$_{75}$M' where R is —CH$_3$ and R' is —(CH$_2$)$_3$(EO)$_{18}$(PO)$_{18}$OAc |
| D | M'D'$_{50}$M' where R is —CH$_3$ and R' is —(CH$_2$)$_3$(EO)$_{18}$(PO)$_{18}$OH |
| E | M'D'$_{13}$M' where R is —CH$_3$ and R' is —(CH$_2$)$_3$(EO)$_{12}$OH |
| F | MD$_{22}$D'$_2$M where R is —CH$_3$ and R' is —(CH$_2$)$_3$(EO)$_{12}$(PO)$_{12}$OH |

Cosurfactant

Emulsions prepared according to the invention may contain a cosurfactant. The cosurfactant can be a compound such as a monohydroxy alcohol, a diol, a triol, or it can be a glycol ether. Some representative cosurfactants which can be used include 1-butanol, 1-pentanol, 1-decanol, 1-hexadecanol, ethylene glycol, propylene glycol, trimethylene glycol, glycerol, and di(ethylene) glycol hexyl ether. Most preferred are glycol ethers which are available commercially from The Dow Chemical Company, Midland, Mich., under their trademark DOWANOL®.

≡Si—H Containing Polysiloxane

The Si—H polysiloxane is represented by compounds of the formula R$_3$SiO(R'$_2$SiO)$_a$(R"HSiO)$_b$SiR$_3$, compounds of the formula HR$_2$SiO(R'$_2$SiO)$_c$SiR$_2$H, or compounds of the formula HR$_2$SiO(R'$_2$SiO)$_a$(R"HSiO)$_b$SiR$_2$H, and mixtures thereof. In the three formulas, R, R', and R", are alkyl groups with 1–6 carbon atoms; a is 0–250; b is 1–250; and c is 0–250.

The Si—H containing polysiloxane can also comprise an alkylhydrogen cyclosiloxane or an alkylhydrogen-dialkyl cyclosiloxane copolymer, represented in general by the formula (R'$_2$SiO)$_a$(R"HSiO)$_b$ where R', R", a, and b, are as defined above. Preferably, a is 0–7; and b is 3–10. Some representative compounds are (OSiMeH)$_4$, (OSiMeH)$_3$(OSiMeC$_6$H$_{13}$), (OSiMeH)$_2$(OSiMeC$_6$H$_{13}$)$_2$, and (OSiMeH)(OSiMeC$_6$H$_{13}$)$_3$, where Me is —CH$_3$.

Mono-Alkenyl Polyether

The mono-alkenyl polyether is a compound of the formula CH$_2$=CH(CH$_2$)$_f$O(CH$_2$CH$_2$O)$_g$(CH$_2$CH$_3$CHO)$_h$T, or a compound of the formula CH$_2$=CH—Q—O(CH$_2$CH$_2$O)$_g$(CH$_2$CH$_3$CHO)$_h$T. In the formulas, T represents an end group which can be hydrogen; a C1–C10 alkyl group such as methyl, ethyl, propyl, butyl, and decyl; an aryl group such as phenyl; or a C1–C20 acyl group such as acetyl, propionyl, butyryl, lauroyl, myristoyl, and stearoyl. Q is a divalent linking group containing unsaturation such as phenylene —C$_6$H$_4$—. The value of f is 1–6; g has a value of 4–30; and h can be zero or have a value of 1–100.

α,ω-Diene, α,ω-Diyne, or α,ω-Ene-Yne

Unsaturated hydrocarbons which can be used include α,ω-dienes of the formula CH$_2$=CH(CH$_2$)$_d$CH=CH$_2$ where d is 1–20. Some representative α,ω-dienes are 1,4-pentadiene; 1,5-hexadiene; 1,6-heptadiene; 1,7-octadiene; 1,8-nonadiene; 1,9-decadiene; 1,11-dodecadiene; 1,13-tetradecadiene; and 1,19-eicosadiene.

Other unsaturated hydrocarbons which can be used include α,ω-diynes of the formula CH≡C(CH$_2$)$_e$C≡CH; or α,ω-ene-ynes of the formula CH$_2$=CH(CH$_2$)$_e$C≡CH where e is 0–20. Some representative α,ω-diynes are 1,3-butadiyne HC≡C—C≡CH and 1,5-hexadiyne (dipropargyl) HC≡C—CH$_2$CH$_2$—C≡CH. An example of a suitable α,ω-ene-yne is hexene-5-yne-1 CH$_2$=CHCH$_2$CH$_2$C≡CH.

Silicone Oil

The term silicone oil as used herein is intended to include compounds containing a silicon atom such as (i) low molecular weight linear and cyclic volatile methyl siloxanes, and (ii) low molecular weight linear and cyclic volatile and non-volatile alkyl and aryl siloxanes. Most preferred, however, are low molecular weight linear and cyclic volatile methyl siloxanes (VMS).

VMS compounds correspond to the average unit formula (CH$_3$)$_j$SiO$_{(4-j)/2}$ in which j has an average value of two to three. The compounds contain siloxane units joined by Si—O—Si bonds. Representative units are monofunctional "M" units (CH$_3$)$_3$SiO$_{1/2}$ and difunctional "D" units (CH$_3$)$_2$SiO$_{2/2}$.

The presence of trifunctional "T" units CH$_3$SiO$_{3/2}$ results in the formation of branched linear or cyclic volatile methyl siloxanes. The presence of tetrafunctional "Q" units SiO$_{4/2}$ results in the formation of branched linear or cyclic volatile methyl siloxanes.

Linear VMS have the formula (CH$_3$)$_3$SiO{(CH$_3$)$_2$SiO}$_k$Si(CH$_3$)$_3$. The value of k is 0–5. Cyclic VMS have the formula {(CH$_3$)$_2$SiO}$_m$. The value of m is 3–9. Preferably, these volatile methyl siloxane have a boiling point less than about 250° C. and viscosity of about 0.65 to about 5.0 mm$^2$/s.

Representative linear volatile methyl siloxanes are hexamethyldisiloxane (MM) with a boiling point of 100° C., viscosity of 0.65 mm$^2$/s, and formula Me$_3$SiOSiMe$_3$; octamethyltrisiloxane (MDM) with a boiling point of 152° C., viscosity of 1.04 mm$^2$/s, and formula Me$_3$SiOMe$_2$SiOSiMe$_3$; decamethyltetrasiloxane (MD$_2$M) with a boiling point of 194° C., viscosity of 1.53 mm$^2$/s, and formula Me$_3$SiO(Me$_2$SiO)$_2$SiMe$_3$; dodecamethylpentasiloxane (MD$_3$M) with a boiling point of 229° C., viscosity of 2.06 mm$^2$/s, and formula Me$_3$SiO(Me$_2$SiO)$_3$SiMe$_3$; tetradecamethylhexasiloxane (MD$_4$M) with a boiling point of 245° C., viscosity of 2.63 mm$^2$/s, and formula Me$_3$SiO(Me$_2$SiO)$_4$SiMe$_3$; and hexadecamethylheptasiloxane (MD$_5$M) with a boiling point of 270° C., viscosity of 3.24 mm$^2$/s, and formula Me$_3$SiO(Me$_2$SiO)$_5$SiMe$_3$.

Representative cyclic volatile methyl siloxanes are hexamethylcyclotrisiloxane (D$_3$) a solid with a boiling point of 134° C. and formula {(Me$_2$)SiO}$_3$; octamethylcyclotetrasiloxane (D$_4$) with a boiling point of 176° C., viscosity of 2.3 mm$^2$/s, and formula {(Me$_2$)SiO}$_4$; decamethylcyclopentasiloxane (D$_5$) with a boiling point of 210° C., viscosity of 3.87 mm$^2$/s, and formula {(Me$_2$)SiO}$_5$; and dodecamethylcyclohexasiloxane (D$_6$) with a boiling point of 245° C., viscosity of 6.62 mm$^2$/s, and formula {(Me$_2$)SiO}$_6$.

Representative branched volatile methyl siloxanes are heptamethyl-3-{(trimethylsilyl)oxy}trisiloxane (M$_3$T) with a boiling point of 192° C., viscosity of 1.57 mm$^2$/s, and formula C$_{10}$H$_{30}$O$_3$Si$_4$; hexamethyl-3,3,bis {(trimethylsilyl)oxy} trisiloxane (M$_4$Q) with a boiling point of 222° C., viscosity of 2.86 mm$^2$/s, and formula C$_{12}$H$_{36}$O$_4$Si$_5$; and pentamethyl {(trimethylsilyl)oxy} cyclotrisiloxane (MD$_3$) with the formula C$_8$H$_{24}$O$_4$Si$_4$.

The invention also includes using low molecular weight linear and cyclic volatile and non-volatile alkyl and aryl siloxanes represented respectively by formulas R$_3$SiO $(R_2SiO)_nSiR_3$ and $(R_2SiO)_p$. R can be alkyl groups with 2–20 carbon atoms or aryl groups such as phenyl. The value of n is 0–80, preferably 5–20. The value of p is 3–9, preferably 4–6. These polysiloxanes have a viscosity generally in the range of about 1–100 mm²/s.

Polysiloxanes can also be used where n has a value sufficient to provide siloxane polymers with a viscosity in the range of about 100–1,000 mm²/sec. Typically, n can be about 80–375. Illustrative of such polysiloxanes are polydimethylsiloxane, polydiethylsiloxane, polymethylethylsiloxane, polymethylphenylsiloxane, and polydiphenylsiloxane.

If desired, the silicone oil component can be omitted.

Catalyst

Polymerization of the ≡Si—H containing polysiloxane, the mono-alkenyl polyether, and the α,ω-diene, α,ω-diyne, or α,ω-ene-yne, requires a catalyst to effect the reaction between the SiH containing polysiloxane, the mono-alkenyl polyether, and the α,ω-unsaturated hydrocarbon. Suitable catalysts are Group VIII transition metals, i.e., the noble metals. Such noble metal catalysts are described in U.S. Pat. No. 3,923,705, incorporated herein by reference. A particularly preferred catalyst is described in Karstedt's U.S. Pat. Nos. 3,715,334 and 3,814,730, incorporated herein by reference. Karstedt's catalyst is a platinum divinyl tetramethyl disiloxane complex, typically containing about one weight percent of platinum, carried in a polydimethylsiloxane fluid or in a solvent such as toluene.

The particular catalysts used in Examples 1 and 2 appearing below were 20 μl and 200 μl portions, respectively, of Karstedt's catalyst, used as one weight percent of platinum carried in a 2.0 mm²/s polydimethylsiloxane fluid. Another preferred platinum catalyst is a reaction product of chloroplatinic acid and an organosilicon compound containing terminal aliphatic unsaturation. It is described in U.S. Pat. No. 3,419,593, incorporated herein by reference. The noble metal catalysts are used in amounts from 0.00001–0.5 parts of noble metal per 100 weight parts of SiH containing polysiloxane, preferably 0.00001–0.02 parts of noble metal, most preferably 0.00001–0.002 parts of noble metal.

In preparing compositions according to the first embodiment of the invention, the following amounts of each of the components in percent by weight of the composition, can be employed:

(i) 5–60 percent by weight of the non-crosslinked silicone polyether;
(ii) optionally, 5–60 percent by weight of the cosurfactant;
(iii) 5–50 percent by weight of the ≡Si—H containing polysiloxane;
(iv) 5–50 percent by weight of the mono-alkenyl polyether;
(v) 1–10 percent by weight of the α,ω-diene, α,ω-diyne, or α,ω-ene-yne;
(vi) optionally, 5–60 percent by weight of the silicone oil;
(vii) 1–100 parts per million of platinum catalyst; and
(viii) 10–60 percent by weight of water.

In preparing compositions according to the second embodiment of the invention, the following amounts of each of the components in percent by weight of the composition, can be employed:

(i) 1–50 percent by weight of the non-crosslinked silicone polyether;
(ii) 1–50 percent by weight of the cosurfactant;
(iii) 0.1–73.0 percent by weight of the crosslinked silicone elastomer containing no oxyalkylene units; and
(iv) 25–97.9 percent by weight of water.

Compositions made according to the invention may contain other components, as required, for preparing the compositions for particular applications. Representative of such components are, for example, (i) additives for stabilizing the composition or adjusting its viscosity such as ethanol, or water soluble polymers such as xanthan gum, guar gum, carboxymethyl cellulose, polyvinyl alcohol, polyvinylpyrrolidone, carboxyvinyl polymers, hydroxyethyl cellulose, and polyoxyethylene glycol distearate; (ii) film forming agents such as polymers of radically polymerizable (meth)acrylic monomers, copolymers of silicone polymers with radically polymerizable (meth)acrylic monomers, poly (N-acylalkylene imines), poly(N-methylpyrrolidones), and silicone resins which contain fluorinated organic groups, amino groups, or silanol groups; (iii) oxidation inhibitors such as butylated hydroxyanisole (BHA), butylated hydroxy toluene (BHT), and orizanol; (iv) antifreezes such as ethanol, isopropyl alcohol, 1,3-butylene glycol, ethylene glycol, propylene glycol, and glycerol; (v) antimicrobials and preservatives such as TRICLOSAN and TRICLOCARBAN; (vi) pearlescent agents; (vii) chelating agents such as ethylene diamine tetraacetic acid, citric acid, and ethane-1-hydroxy-1,1-diphosphonic acid; (viii) UV absorbers including benzophenone derivatives such as 2-hydroxy-4-methoxy benzophenone, benzotriazole derivatives such as 2-(2'-hydroxy-5'-methylphenyl) benzotriazole, and cinnamic acid esters; (ix) colorants such as chromatogens, dyes, and pigments; (x) aerosol spray enabling agents; (xi) vitamins; (xii) hair tonics; (xiii) growth promoters; (xiv) hormones; (xv) fragrances; and (xvi) perfumes.

While mechanical equipment such as mixers, mills, homogenizers, and extruders, can be used in preparing compositions of the invention, it is most preferred to form them without application of any shearing force, as by simply handshaking the ingredients.

EXAMPLES

The following examples are set forth in order to illustrate the invention in more detail.

Example 1

Illustration of First Embodiment

An oil-in-water microemulsion containing an in situ prepared crosslinked silicone polyether was formed by combing and handshaking the following ingredients in a sealed vial:

a. 2.4983 gram of a non-crosslinked silicone polyether having the formula $MD_{22}D'_2M$ where M is $(CH_3)_3SiO$—, D is $(CH_3)_2SiO$═, and D' is $(CH_3)(EO_{12}PO_{12})SiO$═;

b. 2.5224 gram of the cosurfactant di(ethylene)glycol hexyl ether of the formula $CH_3(CH_2)_5OCH_2CH_2OCH_2CH_2OH$;

c. 2.5633 gram of deionized water;

d. 0.2767 of the ≡Si—H containing polysiloxane of the formula $MD_{8.7}D'_{3.7}M$ where M is $(CH_3)_3SiO$—, D is $(CH_3)_2SiO$═, and D' is $(CH_3)(H)SiO$═;

e. 2.0010 gram of the volatile silicone oil $D_5$, i.e., decamethylcyclopentasiloxane;

f. 0.1967 gram of the mono-alkenyl polyether of the formula $CH_2$═$CHCH_2O(CH_2CH_2O)_{12}H$;

g. 0.0270 gram of platinum catalyst;

h. 0.065 gram of the α,ω-diene compound 1,5-hexadiene, i.e., $CH_2$═$CH(CH_2)_2CH$═$CH_2$.

The sealed vial and its contents were placed in an oven for one hour at 90° C. to initiate the polymerization reaction, forming a suspension of cured particles of a crosslinked silicone polyether in water.

Example 2

Illustration of Second Embodiment

An oil-in-water microemulsion containing cured particles of a crosslinked silicone elastomer having no oxyalkylene units in its molecule, was formed by adding the following ingredients to a vial:

- a. 4.9891 gram of a crosslinked silicone elastomer having no oxyalkylene units in its molecule. The crosslinked silicone elastomer was swollen with about 86.5 percent by weight of volatile silicone oil decamethylcyclopentasiloxane. The $D_5$ swollen elastomer was prepared by reacting (i) $\equiv$Si—H containing polysiloxane $MD_{8.7}D'_{3.7}M$ where M is $(CH_3)_3SiO$—, D is $(CH_3)_2SiO$=, and D' is $(CH_3)(H)SiO$=, with (ii) $\alpha,\omega$-diene 1,5-hexadiene. The reaction was carried out in the presence of $D_5$ according to the method in U.S. Pat. No. 5,654,362 (Aug. 5, 1997).
- b. 5.0145 gram of non-crosslinked silicone polyether $MD_{22}D'_2M$ where M is $(CH_3)_3SiO$—, D is $(CH_3)_2SiO$=, and D' is $(CH_3)(EO_{12}PO_{12})SiO$=;
- c. 2.5532 gram of cosurfactant di(ethylene)glycol hexyl ether; and
- d. 5.0613 gram of deionized water.

The vial and its contents were handshaken for one minute, in order to disperse the cured particles of crosslinked silicone elastomer, in water.

The crosslinked silicone elastomer having no oxyalkylene units in its molecule, used in Example 2, is a material typically referred to in the art, as a non-emulsifying silicone elastomer, meaning that polyoxyalkylene units are absent.

Compositions prepared according to the invention can be used in various over-the-counter (OTC) personal care products. Thus, they can be used in antiperspirants, deodorants, skin creams, skin care lotions, moisturizers, facial treatments such as acne or wrinkle removers, personal and facial cleansers, bath oils, perfumes, colognes, sachets, sunscreens, pre-shave and after-shave lotions, liquid soaps, shaving soaps, shaving lathers, hair shampoos, hair conditioners, hair sprays, mousses, permanents, depilatories, cuticle coats, make-ups, color cosmetics, foundations, blushes, lipsticks, lip balms, eyeliners, mascaras, oil removers, color cosmetic removers, and powders. The compositions are also useful as carriers for pharmaceuticals, biocides, herbicides, pesticides, and to incorporate water and water-soluble substances into hydrophobic systems.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of preparing emulsions comprising heating and polymerizing a mixture containing (i) a non-crosslinked silicone polyether; (ii) optionally, a cosurfactant selected from the group consisting of monohydroxy alcohols, diols, triols, and glycol ethers; (iii) an $\equiv$Si—H containing polysiloxane; (iv) a mono-alkenyl polyether; (v) an $\alpha,\omega$-diene, $\alpha,\omega$-diyne, or $\alpha,\omega$-ene-yne; (vi) optionally, a silicone oil selected from the group consisting of (a) low molecular weight linear and cyclic volatile methyl siloxanes, and (b) low molecular weight linear and cyclic volatile and non-volatile alkyl and aryl siloxanes; (vii) a platinum catalyst; and (viii) water.

2. A method according to claim 1 in which the cosurfactant is selected from the group consisting of 1-butanol, 1-pentanol, 1-decanol, 1-hexadecanol, ethylene glycol, propylene glycol, trimethylene glycol, glycerol, and di(ethylene) glycol hexyl ether.

3. A method according to claim 1 in which the mixture contains
   (i) 5–60 percent by weight of the non-crosslinked silicone polyether;
   (ii) 5–60 percent by weight of the cosurfactant;
   (iii) 5–50 percent by weight of the $\equiv$Si—H containing polysiloxane;
   (iv) 5–50 percent by weight of the mono-alkenyl polyether;
   (v) 1–10 percent by weight of the $\alpha,\omega$-diene, $\alpha,\omega$-diyne, or $\alpha,\omega$-ene-yne;
   (vi) 5–60 percent by weight of the silicone oil;
   (vii) 1–100 parts per million of platinum catalyst; and
   (viii) 10–60 percent by weight of water.

4. A method according to claim 1 in which the emulsion is prepared without application of any mechanical shearing force.

* * * * *